(12) United States Patent
Senda

(10) Patent No.: US 8,238,955 B2
(45) Date of Patent: Aug. 7, 2012

(54) RADIO COMMUNICATION METHOD AND RADIO COMMUNICATION DEVICE

(75) Inventor: Mitsuharu Senda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 403 days.

(21) Appl. No.: 12/667,017

(22) PCT Filed: Jun. 18, 2008

(86) PCT No.: PCT/JP2008/061122
§ 371 (c)(1),
(2), (4) Date: Dec. 28, 2009

(87) PCT Pub. No.: WO2009/001727
PCT Pub. Date: Dec. 31, 2008

(65) Prior Publication Data
US 2010/0178885 A1    Jul. 15, 2010

(30) Foreign Application Priority Data
Jun. 28, 2007  (JP) ................................ 2007-170032

(51) Int. Cl.
*H04Q 7/20* (2006.01)
(52) U.S. Cl. .............. 455/502; 455/507; 455/67.11; 455/522; 455/426.1; 455/69; 370/310; 370/345; 370/350; 370/503; 375/354; 375/358

(58) Field of Classification Search .......... 455/502, 455/507, 522.1, 68, 69, 127.1, 67.11, 445, 455/466, 423–425, 509, 422.1, 403, 426.1, 455/426.2, 500, 517; 370/310, 328, 345, 370/338, 350–514; 375/354, 358
See application file for complete search history.

(56) References Cited

U.S. PATENT DOCUMENTS
6,735,451 B1 *  5/2004  Jarleholm et al. ............ 455/561
2002/0160821 A1 * 10/2002  Kaikati et al. ................ 455/574

FOREIGN PATENT DOCUMENTS
| JP | 10-150408 | 6/1998 |
| JP | 10-336104 | 12/1998 |
| JP | 2003-110499 | 4/2003 |

* cited by examiner

*Primary Examiner* — Keith Ferguson
(74) *Attorney, Agent, or Firm* — Morrison & Foerster LLP

(57) ABSTRACT

The radio communication method for transmitting a burst signal including a synchronization identification signal and a data signal according to the present invention comprises a step for comparing the error tolerances of the synchronization identification signal and the data signal and a step for varying transmission power(s) of one or both of the synchronization identification signal and the data signal in accordance with the error tolerances compared (FIG. 3).

6 Claims, 7 Drawing Sheets

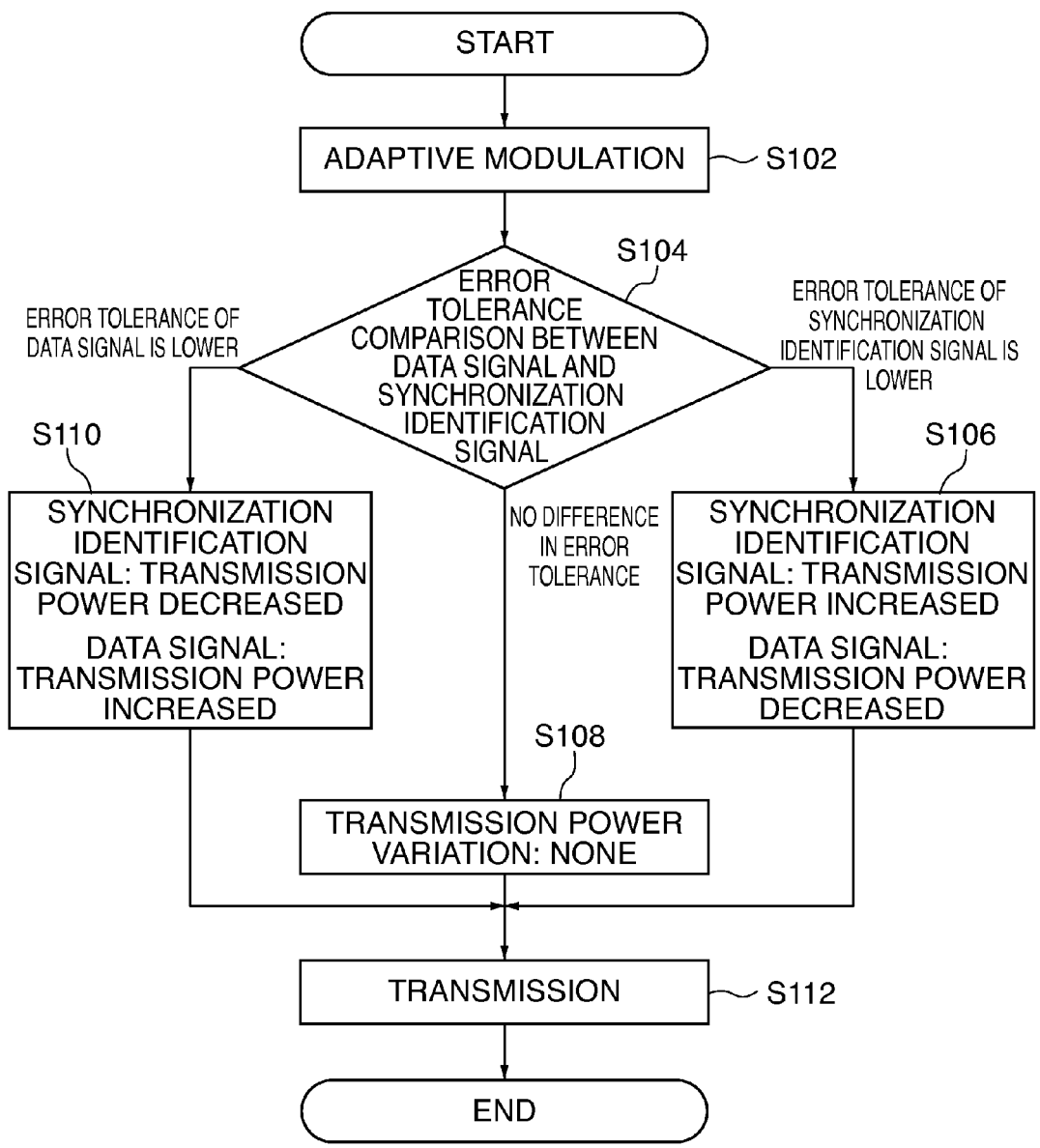

FIG. 6A

TABLE OF MODULATION METHOD AND
TRANSMISSION POWER VARIATION

| SIGNAL IDENTIFICATION METHOD | | BPSK | |
|---|---|---|---|
| TRANSMISSION POWER | | TRANSMISSION POWER VARIATION OF SYNCHRONIZATION IDENTIFICATION SIGNAL | TRANSMISSION POWER VARIATION OF DATA SIGNAL |
| DATA MODULATION CLASS | FEC_BPSK | 10 | -5.0 |
| | FEC_QPSK | 8 | -2.5 |
| | BPSK | 0 | 0.0 |
| | QPSK | -4 | 1.0 |
| | 16QAM | -9 | 3.0 |
| | 64QAM | -15 | 5.0 |

FIG. 6B

GRAPH OF TABLE OF MODULATION METHOD AND
TRANSMISSION POWER VARIATION

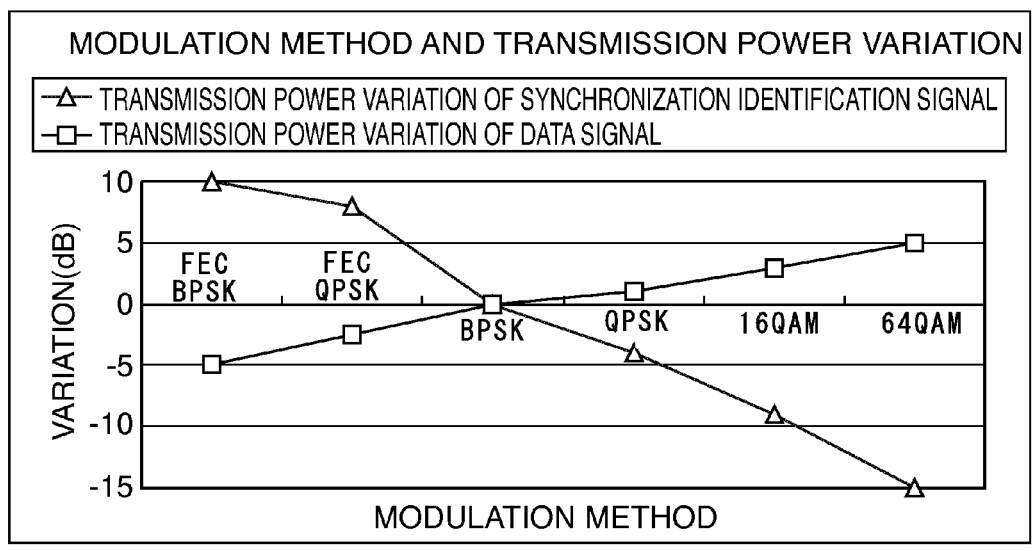

RADIO COMMUNICATION METHOD AND RADIO COMMUNICATION DEVICE

CROSS-REFERENCE TO RELATED APPLICATIONS

This is a US National Phase Application of International Application No. PCT/JP2008/061122 filed Jun. 18, 2008, which claims priority to Japanese Patent Application No. 2007-170032 filed Jun. 28, 2007, the disclosures of which are incorporated herein by reference in their entirety.

BACKGROUND OF THE INVENTION

The present invention relates to a radio communication method and a radio communication device for transmitting a burst signal including a synchronization identification signal and a data signal during communication.

TDD/TDMA (Time Division Duplex/Time Division Multiple Access) is known as one of typical radio communication methods used for example in PHS (Personal Handy-phone system). TDD switches the same radio path to an uplink and a downlink frequently along the time axis. TDMA allows several users to share the same frequency channel by dividing the signal into different time slots.

In TDMA, a burst signal is transmitted from a radio communication terminal to a base station intermittently. The burst signal includes from its top a synchronization identification signal (also referred to as "preamble"), data format signal and data signal (also referred to as "burst data"). The synchronization identification signal is a signal mainly for keeping data synchronization to recover data. The data format signal is a signal for indicating a modulation method for the subsequent data signal. More specifically, in the case of PHS or EVDO using CDMA, unique word and pilot symbol correspond to symbol for synchronization, modulation information corresponds to the data format, and signal data symbol corresponds to the data signal.

There are modulation methods for data signal such as BPSK (Binary Phase Shift Keying), QPSK (Quadrature Phase Shift Keying), 16QAM (Quadrature Amplitude Modulation) and 64QAM. An error correction technique such as FEC (Forward Error Correction) is used in those modulation methods.

The reachable distance of a radio wave broadcasted from a base station to terminals is defined by a value "link budget" (dB). The larger a link budget becomes, the bigger a cell of radio wave formed by a base station becomes. Therefore, communication in a wide area can be served by a less number of base stations.

A link budget is improved when an absolute power of radio wave is increased by increasing a transmit power of the radio wave or by intensifying antenna gain. A link budget is improved also when the Line of Site (LOS) condition is improved and reaching power between a base station and terminals is increased, by locating a base station at a higher position.

Patent Document 1 (Japan Laid Open Patent H10-336104) discloses a prior art in which the transmission power level of radio wave from a mobile station is measured by a receiver, and based on the measured transmission power level the output power level of a transmitter is controlled. In Patent Document 1, it is determined how much output power level of radio wave is appropriate for the mobile station to receive radio wave of a certain intensity of electric field. Then, based on the level of received radio wave, the output power level of the transmitter is controlled in the time slot for communicating with the mobile station.

However, there is an increasing limit to the transmit power since an effective transmit power thereof is restricted by a communication standard or a communication law. In addition, Patent Document 1 is for reducing radio wave interference generated between base stations by controlling the output power level so that it works exclusively for reducing a radio wave reachable range. So, Patent Document 1 cannot be used for improving the link budget.

It is easy way to arrange an antenna on the top of a building for locating a base station at a higher position. However, there is not always a high building around a place where an antenna should be arranged. Even if there is such a high building, it is not always allowed to arrange an antenna in the building. Therefore, it is not a reliable way to use a high building for the purpose.

As argued above, an alternative way to improve the link budget should be considered.

Patent Document 1: Japan Laid Open Patent H10-336104

In order to improve the link budget, the inventor paid attention to the fact that if radio communication by lower effective transmit power were possible, a base station could communicate with a mobile station more distant from it i.e. the link budget could be improved.

In order to make a communication possible even by lower effective transmit power, SN (Signal/Noise) ratio should be raised. For this purpose, the error correction technique FEC can be used for improving communication quality i.e. error tolerance. However, the synchronization identification signal does not conform to FEC. If FEC process were applied to the synchronization identification signal, the communication would be terminated. Accordingly, FEC can be applied only to the data signal. The error tolerance of the data signal part of a burst signal can be improved when applying FEC to the data signal part, but the error tolerance of the synchronization identification signal part cannot be improved since FEC cannot be applied to the synchronization identification signal part.

FIG. 7 shows a relationship between conventional effective transmit power and error rate. In FIG. 7, synchronization identification signals are those of BPSK and QPSK and data signals are those of FEC-BPSK and FEC-QPSK to which FEC has been applied.

As known from FIG. 7, in any one of the communication methods, the higher effective transmit power becomes, the lower error rate such as frame error rate becomes. It means that the error rate is improved. Error rates of the FEC-applied data signals are improved linearly and rapidly as the effective transmit power is increased. On the other hand, error rates of the synchronization identification signals of BPSK and QPSK are not so improved even if the effective transmit power is increased. At the error rate threshold i.e. communication limit, there is a large difference w0 in the effective transmit power, for example between BPSK and FEC-BPSK. That is to say, error tolerance difference is generated. As apparent from this, the link budget improvement of whole system reaches the limit in the part without FEC.

So, the object of the present invention is to provide a radio communication method and a radio communication device which can improve the link budget without increasing the effective transmit power in order to enlarge a size of a cell formed by a base station.

In order to solve the above stated problems, according to the present invention, a radio communication method for transmitting a burst signal including a synchronization identification signal and a data signal comprising: a step for comparing the error tolerances of the synchronization identification signal and the data signal; and a step for varying transmission power(s) of one or both of the synchronization identification signal and the data signal in accordance with the error tolerances compared.

According to the method above, the transmission powers of the synchronization identification signal and the data signal in the burst signal can be controlled separately in accordance with their error tolerances. Therefore, radio communication with an appropriate transmission power level can be carried out.

In said step for varying transmission power(s), it is preferable to increase the transmission power of one of the signals, the synchronization identification signal or the data signal, with a lower error tolerance. According to this, the error rate of only one of the signals with a higher error rate can be decreased so that the link budget can be improved.

In said step for varying transmission power (s), it is also preferable to decrease the transmission power of one of the signals, the synchronization identification signal or the data signal, with a higher error tolerance. According to this, the transmission power of one of the signals with a lower error rate can be reduced so that an efficient communication is achieved.

In said step for varying transmission power (s) of one or both of the synchronization identification signal and the data signal, the effective transmit power of the whole burst signal may be an almost fixed value and the effective transmit power of one of the signals is increased and the effective transmit power of the other one is decreased. According to this, the link budget of the whole system can be improved without increasing the effective transmit power.

The transmission power of the synchronization identification signal or of the data signal may be varied in accordance with an error tolerance determined based on the modulation method for the data signal and synchronization identification signal. The error rate may be actually measured during communication, but if a modulation method is decided, the error rate of an effective transmit power is also decided by calculation or by experiences. Accordingly, the amount of transmission power variation can also be determined. In other words, without taking care of the error rate, the amount of variation of the effective transmit power can be determined only from the modulation method in order to control transmitting power.

According to the present invention, a radio communication device for radio-communicating with a base station or with a radio communication terminal comprising: a communication unit for transmitting or receiving a burst signal including a synchronization identification signal and a data signal; an error tolerance comparison unit for comparing error tolerances of the synchronization identification signal and of the data signal included in the burst signal; and a transmitting power control unit for controlling the output power of said communication unit; wherein said transmitting power control unit varies transmission power(s) of one or both of the synchronization identification signal and the data signal in the burst signal in accordance with the comparison result of said error tolerance comparison unit.

According to the above structure of the radio communication device of the invention, the synchronization identification signal and the data signal in the burst signal can be transmission power-controlled separately in accordance with their error tolerances. Therefore, radio communication with an appropriate transmission power level can be carried out.

EFFECTS OF THE INVENTION

According to the present invention, radio communication with a transmission power level appropriate for the error tolerance can be carried out. Besides, the link budget of the whole system can be improved without increasing the effective transmit power in order to enlarge a size of a cell formed by a base station.

BRIEF EXPLANATION OF THE DRAWINGS

FIG. 5 is a flowchart for explaining the operation of the communication terminal.

FIG. 6A shows a relationship between a modulation method and a corresponding amount of transmission power variation.

FIG. 6B shows a relationship between another modulation method and another corresponding amount of transmission power variation.

EXPLANATION OF REFERENCE NUMERALS

110 Communication Terminal
120 Base Station
210 Terminal Control Unit
212 Terminal Memory
214 Display Unit
216 Operation Unit
218 Communication Unit
220 Error Tolerance Comparison Unit
222 Transmitting Power Control Unit

BEST MODE FOR CARRYING OUT THE INVENTION

First Embodiment

A first embodiment of the radio communication method and the radio communication device of the present invention is explained in the following. In the first embodiment, the radio communication method and the radio communication device are explained by way of example of PHS (Personal Handy phone System). However, the present invention may be applied not only to a PHS but also to a mobile phone, VoIP (Voice over Internet Protocol), and any other radio or cable communication system using base stations and exchange stations. The present invention is not limited to the following embodiments with specific sizes, quality of materials and numerals which are only examples described for making the invention understood easily.

Figure 1:
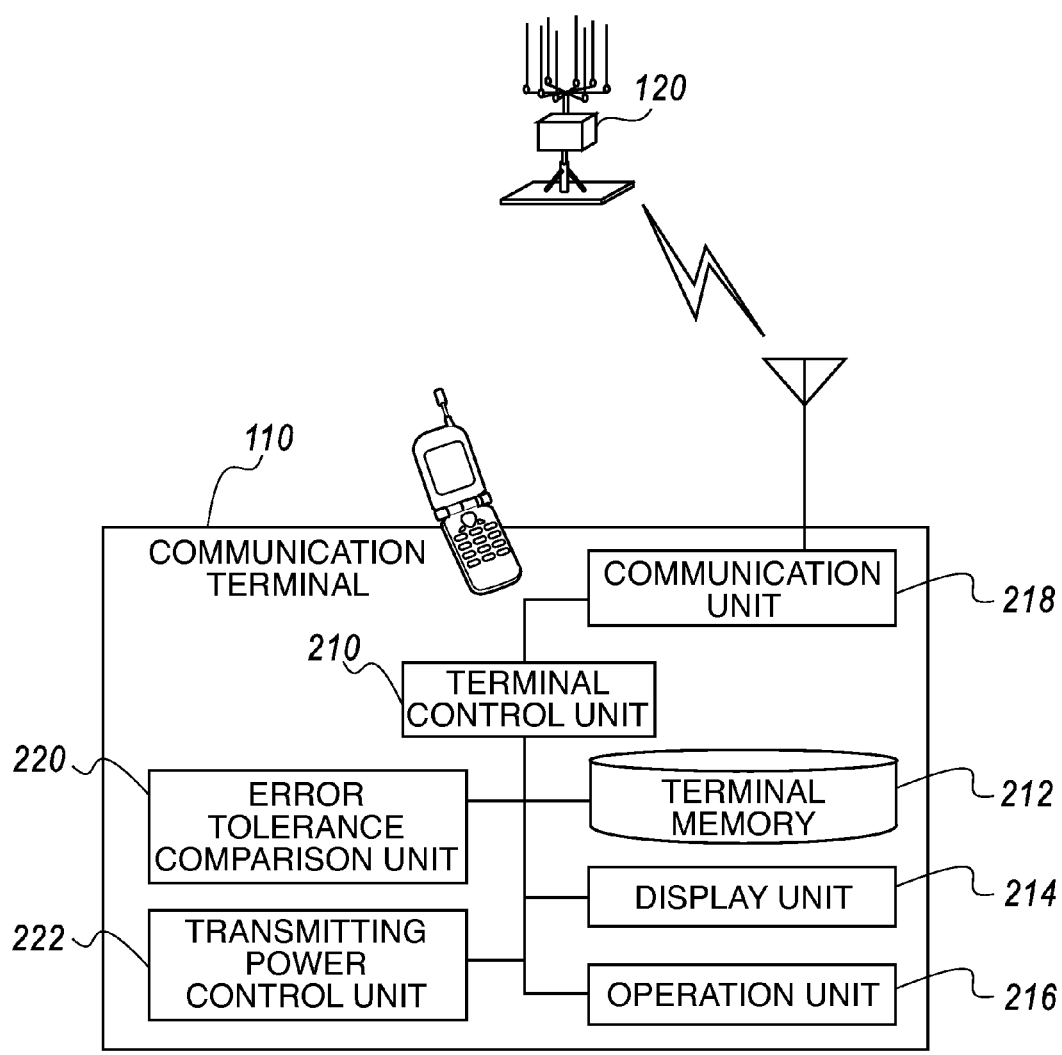
FIG. 1 shows the structure of the radio communication device of a first embodiment of the invention.

FIG. 1 shows the structure of the radio communication device of the first embodiment of the invention. In this embodiment, the radio communication device is a communication terminal 110 of PHS. The communication terminal 110 is connected to a base station 120 in order to establish a radio communication. The communication terminal 110 comprises a terminal control unit 210, a terminal memory 212, a display unit 214, an operation unit 216 and a communication unit 218.

The terminal control unit 210 manages and controls the entire communication terminal 110 via a semiconductor integrated circuit which includes a Central Processing Unit (CPU). The terminal control unit 210 executes a phone call and mail communication using the communication terminal 110 in accordance with programs stored in the terminal memory 212.

The terminal memory 212 may comprise a ROM (Read Only Memory), a RAM (Random Access Memory), an EEPROM (Electrically Erasable Programmable ROM), a Non Volatile RAM, a flash memory, a HDD (Hard Disk Drive) and so on. The memory 212 stores application programs executed by the terminal control unit 210.

The display unit 214 comprises a multi color or single color display. The display unit 214 is adapted to display a GUI (Graphical User Interface) of an application program stored in the terminal memory 212 and web pages provided by a server (not shown) via communication network.

The operation unit 216 comprises switches such as a keyboard, cross-arranged keys, a joystick in order to receive user's input.

The communication unit 218 is adapted to establish radio communication with the base station 120 in the radio communication system. The radio communication is established for example by TDD/TDMA which divides a frame into different time slots in the base station 120 and assigns the divided time slots to each time slot of the communication terminal 110. In this way, the communication unit 218 transmits a burst signal including a synchronization identification signal and a data signal.

In this embodiment, the communication terminal 110 is provided with an error tolerance comparison unit 220 and a transmitting power control unit 222 for controlling the output power of the communication unit 218.

Figure 2:
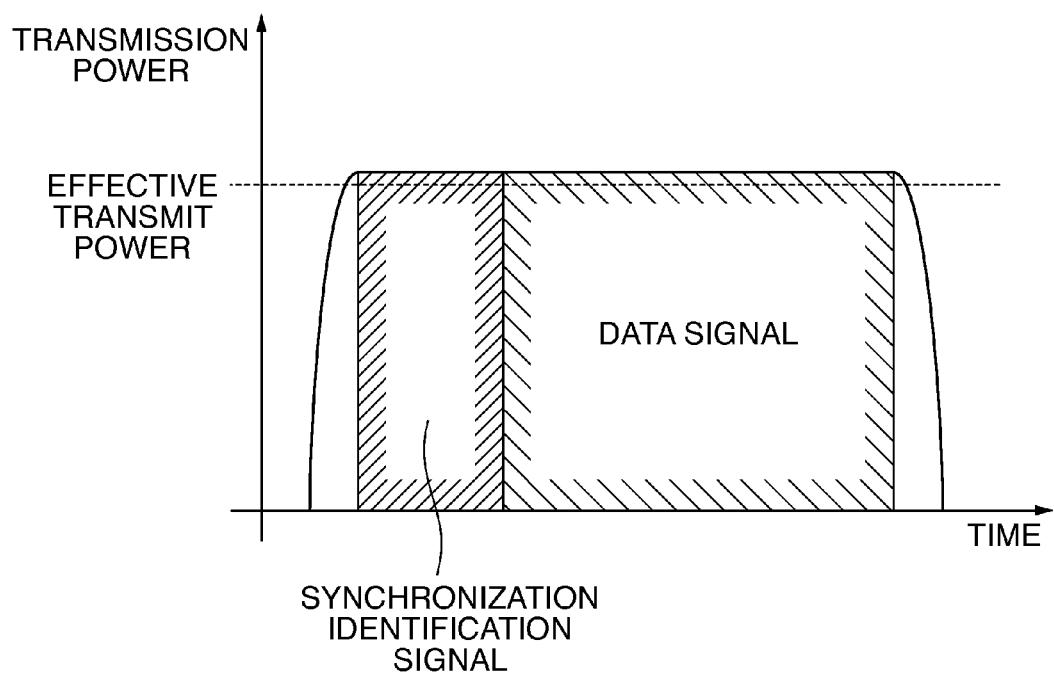
FIG. 2 shows a transmission power distribution in a burst signal in the steady state.

FIG. 2 shows a transmission power distribution in a burst signal in the steady state. As shown in FIG. 2, the burst signal includes from its top a synchronization identification signal and a data signal. The synchronization identification signal is a signal mainly for keeping data synchronization to recover data. The data signal is a data part to be transmitted In TDMA, the burst signal is transmitted from the communication terminal 110 to the base station 120 intermittently.

The error tolerance comparison unit 220 is adapted to compare error tolerances of the synchronization identification signal and of the data signal included in the burst signal. An error tolerance is evaluated by an error rate under the condition of an effective transmit power. A frame error rate is used for the error rate in this embodiment but a bit error rate and any other known error rate can also be used for the error rate.

The transmitting power control unit 222 is adapted to control the output power of the communication unit 218. More specifically, the unit 222 can vary the output power of the burst signal in the middle of the burst signal in this embodiment. The transmitting power control unit 222 varies transmission power(s) of one or both of the synchronization identification signal and the data signal in the burst signal in accordance with the comparison result of the error tolerance comparison unit 220.

Figure 3:
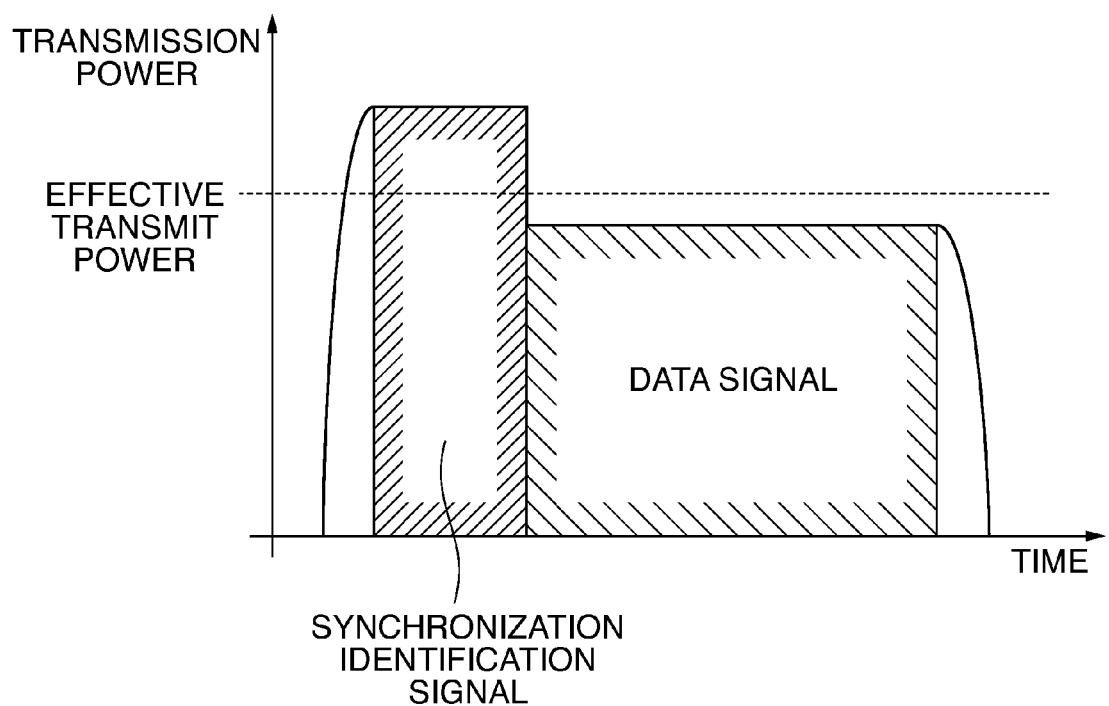
FIG. 3 shows a varied transmission power distribution in the burst signal.

FIG. 3 shows a varied transmission power distribution in the burst signal. As shown in FIG. 3, the transmitting power control unit 222 has offset the transmission power between the synchronization identification signal and the data signal in the burst signal (in other words, the transmission power of them are made are varied). In FIG. 3, for example, the transmission power of the synchronization identification signal is higher than the effective transmit power, and the transmission power of the data signal is lower than the effective transmit power.

The reason why the synchronization identification signal and the data signal are treated separately is because the synchronization identification signal normally uses BPSK or QPSK of low order modulation class for the sake of reliable communication, the data signal uses a modulation method of high order modulation class for the sake of a large amount of transmission data, and the two signals using different modulation methods have different error rates in regard to a transmission power. Most of all, the above reason is because FEC (Forward Error Correction) can be applied to the data signal but cannot be applied to the synchronization identification signal, and therefore, also because of this, the two signals have different error rates in regard to a transmission power.

In this way, the synchronization identification signal and the data signal in the burst signal can be transmission power-controlled separately in accordance with their error tolerances. Therefore, radio communication with an appropriate transmission power level can be carried out.

Figure 4:
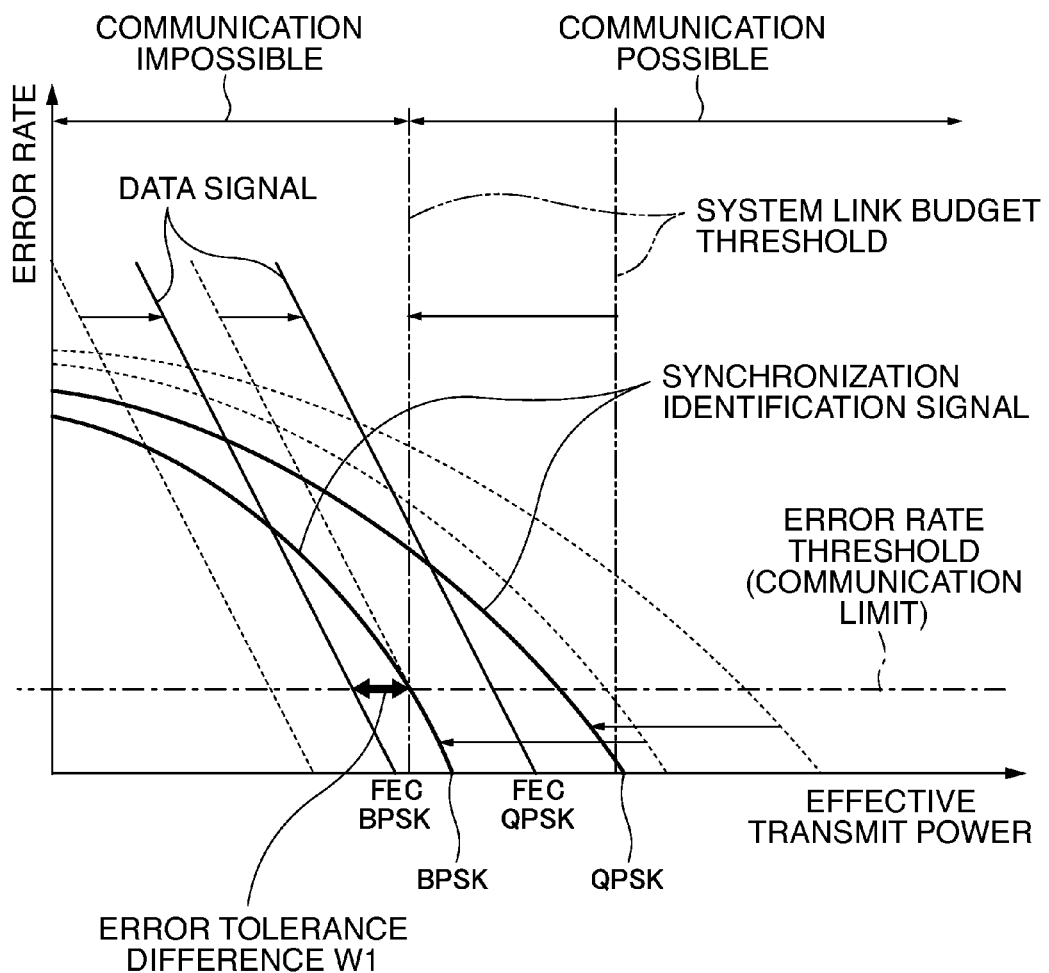
FIG. 4 shows a relationship between the effective transmit power and the error rate under the varied transmission power distribution shown in FIG. 3.
Figure 7:
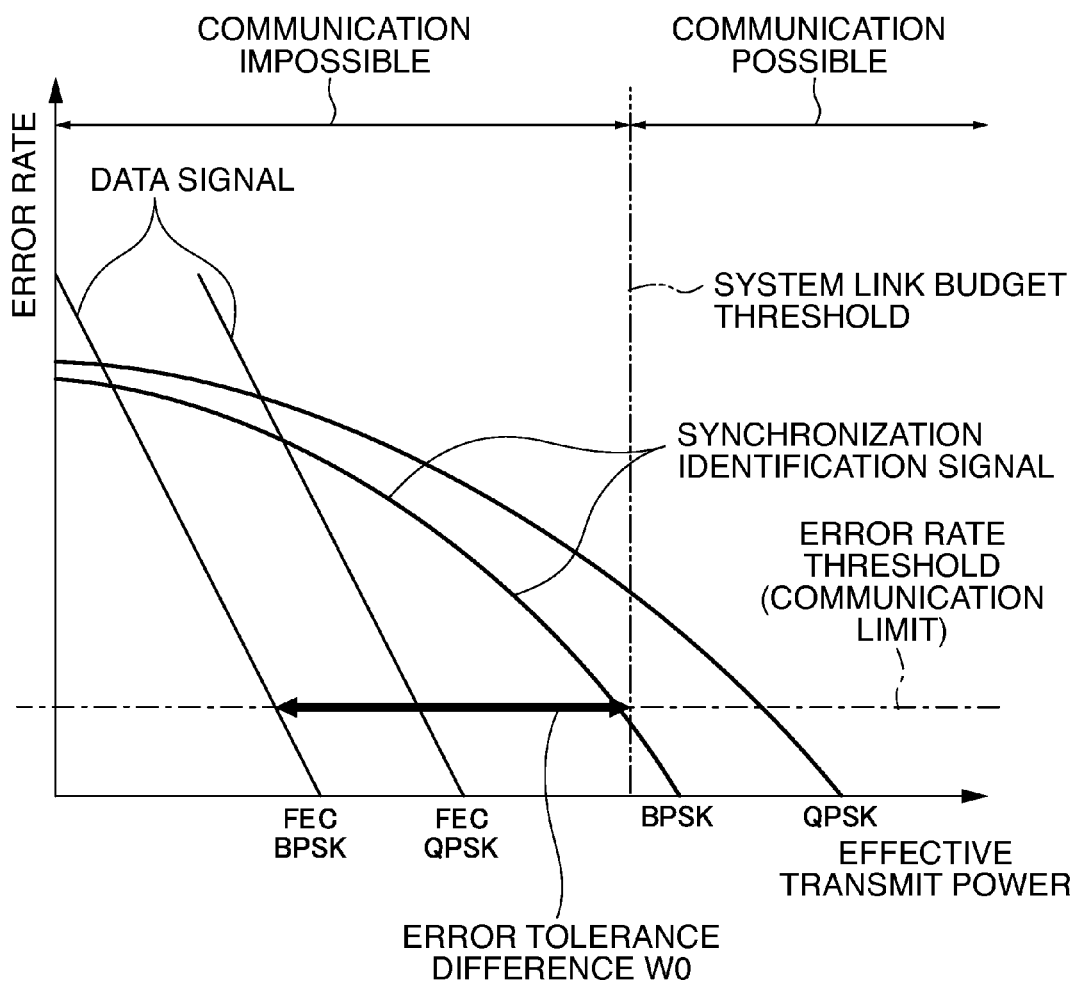
FIG. 7 shows a conventional relationship between the effective transmit power and the error rate.

FIG. 4 shows a relationship between the effective transmit power and the error rate under the varied transmission power distribution shown in FIG. 3. In FIG. 4, the burst signal includes synchronization identification signals of BPSK and QPSK and data signals of FEC-BPSK and FEC-QPSK. In comparison with the combination of FIGS. 2 and 7, the combination of FIGS. 3 and 4 shows that QPSK and BPSK curves in FIG. 4 have been shifted to the left. It means that the error rates of the synchronization identification signals are decreased because the transmission powers thereof are increased.

For example, the BPSK curve has been shifted from that shown by a dotted curve under the steady state to that shown by a solid curve under the power-increased state. Accordingly, the intersection of the BPSK curve and the error rate threshold as the communication limit has been shifted to the low transmission power side. It means that the range capable of communication has been extended. In other words, by increasing the transmission power of one of the signals with a lower error tolerance, the error rate can be decreased and the link budget can be improved.

On the other hand, transmission powers of the data signals to which FEC can be applied have been decreased. For example, FEC-BPSK line has been shifted from that shown by a dotted line under the steady state to that shown by a solid line under the power-decreased state. Accordingly, the intersection of the FEC-BPSK line and the error rate threshold has been shifted to the high transmission power side. In this case the range incapable of communication of FEC-BPSK must be extended, but the range incapable of communication of BPSK is still wider. Therefore, FEC-BPSK will never be a bottleneck. In other words, by decreasing the transmission power of one of the signals with a higher error tolerance, the transmission power of the one signal with a higher error tolerance can be reduced so that an efficient communication is achieved.

When the transmission power of apart of the burst signal is increased and the transmission power of another part is decreased, the error rate of the former part is improved (decreased) and the error rate of the latter part is worse (heighten). Taking advantage of this principle, by increasing the transmission power of a signal with a lower error tolerance and by decreasing the transmission power of another signal with a higher error tolerance, the error tolerance difference w1 between the signals can be reduced. Owing to this, the link budget of the whole system can be improved without increasing the effective transmit power. Especially, since the effective transmit power is restricted not only by a transmission power consumption but also by a communication standard or a communication law, it is a great advantage to be able to improve the link budget without increasing the effective transmit power.

It is required that the difference between the effective transmit power and the peak power should not exceed a predetermined value. So, it is difficult to make the transmission power of a synchronization identification signal extremely larger than the effective transmit power. However, even in the case of using a high order modulation class, the same advantage as that of this embodiment is obtained and therefore the range capable of communication is extended widely. Accordingly, this embodiment can be understood that it extends the range capable of communication in a high order modulation class rather than extends a limit of the range capable of communication for a cell.

By applying the present invention to the high order modulation class, improvement of the communication quality can be expected. That is to say, suppose that the high order modulation class needs a high SN ratio but the synchronization identification signal does not need a high SN ration, SN ration of the high order modulation class part can be improved by decreasing the transmission power of the synchronization identification signal part and by increasing the transmission power of the data part, without increasing the effective transmit power.

Second Embodiment

A second embodiment of the radio communication method and the radio communication device of the present invention is explained in the following. The same elements as those of the first embodiment are indicated by the same reference numerals in order to omit overlapping explanations.

In the burst signal of the first embodiment, the transmission power of the synchronization identification signal is controlled to be higher than that of the data signal. However, such transmission power variation sometimes should be reversed depending on the relationship of error tolerance between the synchronization identification signal and the data signal.

FIG. 5 is a flowchart for explaining the operation of the communication terminal. The communication terminal 110 first executes adaptive modulation (step S102), then compares error tolerances of the synchronization identification signal and of the data signal (S104). In the case that the error tolerance of the synchronization identification signal is lower than that of the data signal, the transmission power of the synchronization identification signal is increased and the transmission power of the data signal is decreased (step S106). If there is no difference in the error tolerances, no transmission power variation is carried out (step S108). In the case that the error tolerance of the data signal is lower than that of the synchronization identification signal, the transmission power of the synchronization identification signal is decreased and the transmission power of the data signal is increased (step S110). Then transmission is carried out by the most appropriate transmission power level (step S112).

FIGS. 6A and 6B show a relationship between each modulation method and each corresponding amount of transmission power variation. The amount of transmission power variation may be determined by actually measuring the error rate during communication. Alternatively, the amount of transmission power variation may be determined by deciding a modulation method and by calculating the error rate in regard to effective transmit power.

As shown in FIGS. 6A and 6B, the transmission power of the synchronization identification signal or of the data signal may be varied in accordance with the error tolerance based on the modulation method for the synchronization identification signal and for the data signal. FIG. 6A is a table which shows a relationship between modulation methods and corresponding amounts of transmission power variation. FIG. 6B is a graph corresponding to the table of FIG. 6A which shows the relationship between modulation methods and corresponding amounts of transmission power variation.

By making such a table for transmission power control beforehand, it is possible to determine the amount of variation for the effective transmit power only from a modulation method, without measuring the error rate.

Although the present invention has been described with reference to the preferred embodiments while referring to the accompanying drawings, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

INDUSTRIAL APPLICATION OF THE INVENTION

The present invention can be applied to a radio communication method and a radio communication device by which a burst signal including a synchronization identification signal and a data signal is transmitted during communication.

What is claimed is:

1. A radio communication method for transmitting a burst signal including a synchronization identification signal and a data signal comprising:
   a step for comparing the error tolerances of the synchronization identification signal and the data signal; and a step for varying transmission power(s) of one or both of the synchronization identification signal and the data signal in accordance with the error tolerances compared.

2. The radio communication method according to claim 1, wherein in said step for varying transmission power (s), the transmission power of one of the signals, the synchronization identification signal or the data signal, with a lower error tolerance is increased.

3. The radio communication method according to claim 1, wherein in said step for varying transmission power (s), the transmission power of one of the signals, the synchronization identification signal or the data signal, with a higher error tolerance is decreased.

4. The radio communication method according to claim 1, wherein in said step for varying transmission power (s), the effective transmit power of the whole burst signal may be an almost fixed value and the effective transmit power of one of the signals, the synchronization identification signal or the data signal, is increased and the effective transmit power of the other one is decreased.

5. The radio communication method according to claim 1, wherein the transmission power of the synchronization identification signal or of the data signal is varied in accordance with an error tolerance determined based on the modulation method for the data signal and synchronization identification signal.

6. A radio communication device for radio-communicating with a base station or with a radio communication terminal comprising:
- a communication unit for transmitting or receiving a burst signal including a synchronization identification signal and a data signal;
- an error tolerance comparison unit for comparing error tolerances of the synchronization identification signal and of the data signal included in the burst signal; and
- a transmitting power control unit for controlling the output power of said communication unit;
- wherein said transmitting power control unit varies transmission power(s) of one or both of the synchronization identification signal and the data signal in the burst signal in accordance with the comparison result of said error tolerance comparison unit.

* * * * *